UNITED STATES PATENT OFFICE.

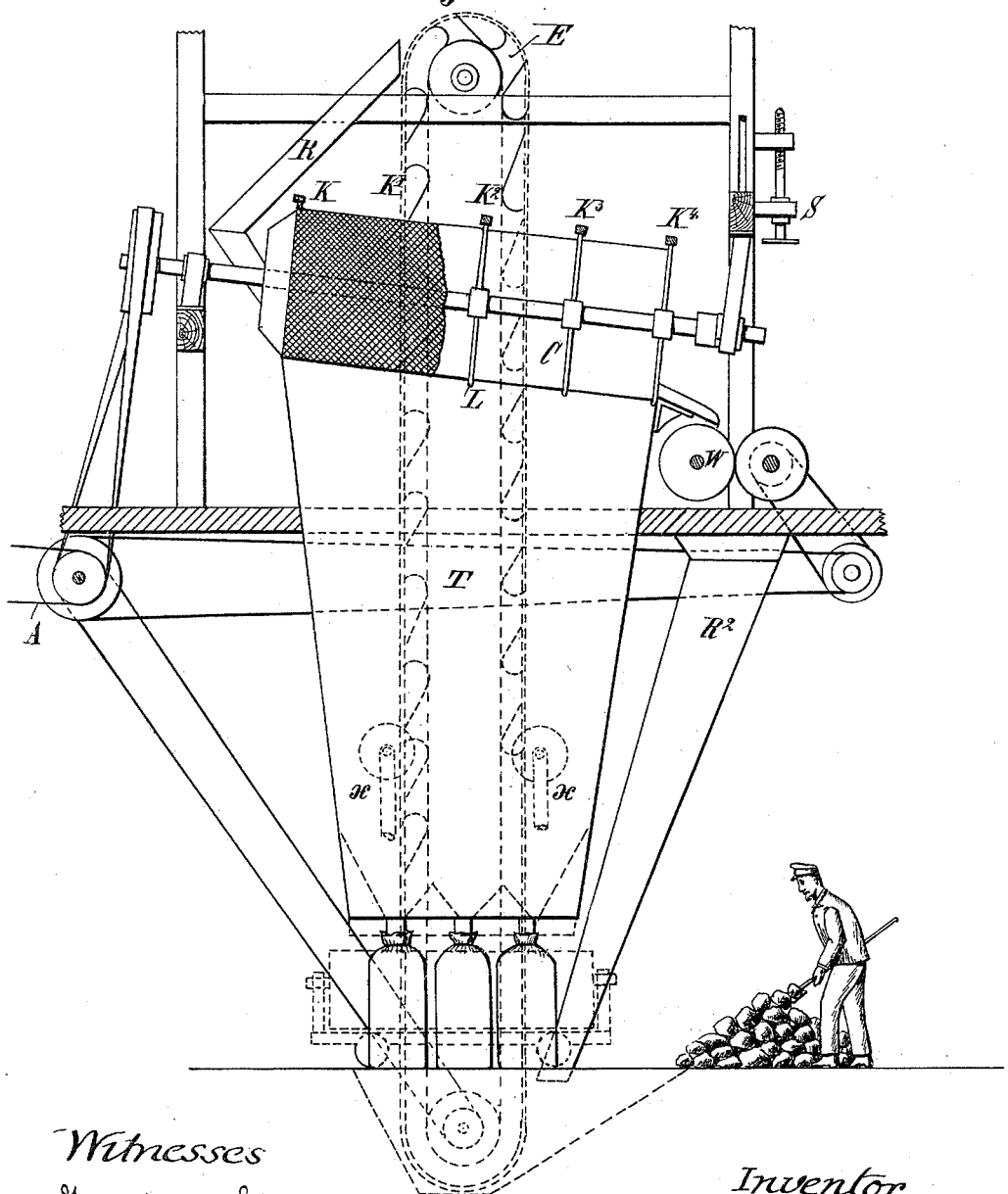

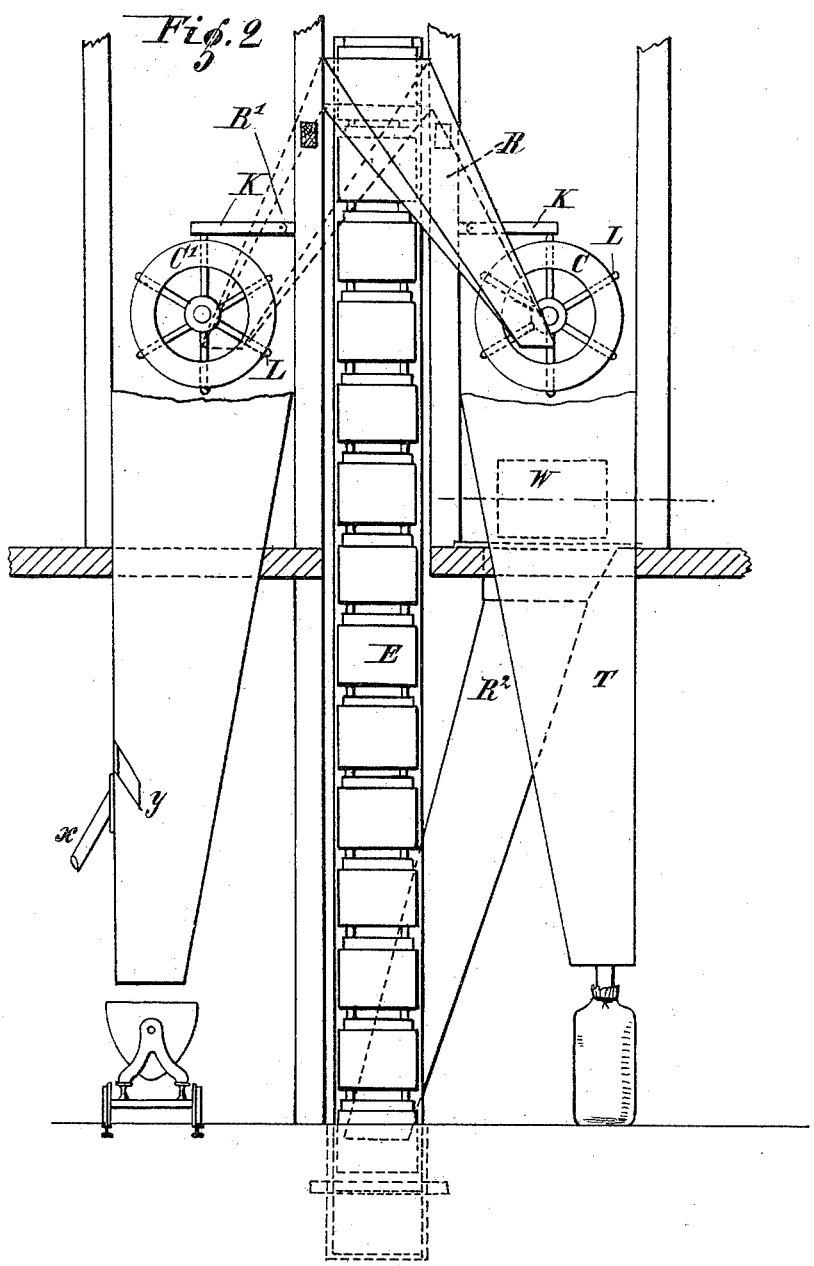

AUGUST NITSCH, OF BRESLAU, GERMANY.

APPARATUS FOR MAKING FERTILIZERS.

SPECIFICATION forming part of Letters Patent No. 619,335, dated February 14, 1899.

Application filed December 21, 1896. Serial No. 616,525. (No model.)

*To all whom it may concern:*

Be it known that I, AUGUST NITSCH, factory director, of Breslau, Province of Silesia, in the German Empire, have invented Apparatus for the Drying and Disintegration of Biphosphates, of which the following is a specification, reference being had therein to the accompanying drawings.

The disintegration of lumps of superphosphates is difficult, because under the influence of mechanical treatment the composition of the material is changed, whereby a delay is caused in the working, but the principal disadvantage is the decrease in the quality of the products.

Superphosphate is made, as is well known, by mixing finely-ground raw phosphate and sulfuric acid. Tribasic phosphated calcium is thereby changed into monobasic phosphated calcium, heat being set free. The mass becomes stiff and forms large hot porous lumps, which have hitherto been allowed to cool. As a consequence the greater amount of water remained inclosed therein and the material became hard. In order to evaporate the superfluous water, the superphosphate is treated in kilns at present, or it is placed in heaps in order to let the air dry it. The material is afterward disintegrated to make it marketable.

The material is disintegrated at present by throwing it against oblique wire sieves. The fine grain is sieved off, the remaining large nuts or lumps are further disintegrated manually by shoveling or beating, and the sieving is repeated. In other cases the lumps of superphosphate are disintegrated in disintegrators or rollers, &c., or the material is placed on rocking sieves and sieved off. However, the latter methods can be only used when the material is very dry, because superphosphates are extremely sensitive to pressure, blows, and friction. When thus treated, water appears at the surface immediately and with it free phosphoric acid. Both substances render the lumps or nuts slimy and unsuitable for further treatment.

Kiln-drying is expensive and has various disadvantages, such as the setting free of fluoric and other corroding acids, which destroy all vegetable and animal life, and, further, as the kiln-drying causes the formation of metaphosphoric acid, which is insoluble in water, and therefore reduces the quality of superphosphates, it has not found ready introduction. In most cases the shoveling up of the heaps of superphosphate is still used to produce a material which is more easily treated and also more valuable, and the use of machinery is avoided.

Now this invention is designed to obviate the above disadvantages and to dry and disintegrate the superphosphates simultaneously.

In order that my invention may be the better understood, I now proceed to describe the same, reference being had to the accompanying drawings, and to the letters marked thereon.

Figure 1 is a front elevation of the apparatus for the drying and simultaneous disintegration of freshly-produced superphosphates and for pulverizing the dried superphosphates. Fig. 2 is a side elevation of the same.

The process is essentially as follows: As before stated, during the mixing of raw phosphates with sulfuric acid and during the chemical reaction which is caused thereby heat is set free, the mass becomes stiff at a temperature of about 96° centigrade and forms large moist lumps. The latter fall easily to pieces when in this condition. They are, therefore, according to my invention, lifted immediately by means of an elevator E and transferred through a chute R' (shown in dotted lines) into a cylinder C', the shell of which is formed of wire-netting of suitable mesh, in which the material is disintegrated. During this operation a hot current of air from any suitable source may be introduced in special cases, which, rising, passes through the cylinder C' and surrounds the lumps during the disintegration. As the lumps gain in surface in proportion to their volume as the disintegration proceeds, they readily yield the superfluous water to the air under the influence of the remaining heat of reaction and become dry. The dried and disintegrated material falls through the meshes of the sieve-shell of the cylinder C' into a chute T' and is ready for market after cooling.

The process may be extended by returning the dried material to the elevator E and feeding it through a chute R (or through the chute R' adjusted into the position shown at R in full lines) to a second cylinder C, in which it is further disintegrated to the desired degree of fineness. The material falls in such case through the meshes of the sieve-drum C into the sacks attached to the funnel T. Pieces which do not become disintegrated pass through the double rolls W and the channel R³ back to the elevator E and into the cylinder C, where they are mixed in their present form with the great mass of fresh material introduced and are readily disintegrated and sieved off.

In order to keep the meshes of the sieving-shells free from choking, beaters K to K⁴ are provided at suitable places and actuated by rods and fixed to the cylinders. The orifices of the air-admission tubes $x$ are protected by shields $y$ against becoming choked by the material treated. These processes have not the slightest injurious effect on the material treated, and the arrangement of devices excels all known apparatus in their capacity of production.

The angle at which the cylinders are placed during operation is adjustable by a device S, in order to lengthen or shorten, according to the nature of the material treated, the period during which the material remains in the cylinders.

The transmission of motion to the various parts of this apparatus is arranged so that by engaging or disengaging the driving-wheel A the whole apparatus or any cylinder may be placed into operation or out of it.

What I claim, and desire to secure by Letters Patent of the United States, is—

The apparatus for the treatment of superphosphates, consisting of the combination of an elevator, oblique rotary sieving-cylinders, means for delivering material from the elevator to either of said cylinders, a receiving chamber or chute beneath said cylinders provided with hot-air-supplying means, crushing-rollers beneath the delivery end of one of the cylinders, means for conducting the crushed material from said rolls to the elevator, and means for receiving the sieved material from said second cylinder.

In witness whereof I have hereunto set my hand in presence of two witnesses.

AUGUST NITSCH.

Witnesses:
MARTIN MEYER,
ERNST KATZ.